United States Patent [19]
Karpicke

[11] Patent Number: 5,528,680
[45] Date of Patent: Jun. 18, 1996

[54] APPARATUS AND METHOD FOR ACCESSING AND MAINTAINING A CALLER-ID BASED TELEPHONE DIRECTORY

[75] Inventor: John A. Karpicke, Indianapolis, Ind.

[73] Assignee: AT&T Corp., Murray Hill, N.J.

[21] Appl. No.: 529,925

[22] Filed: Sep. 18, 1995

Related U.S. Application Data

[63] Continuation of Ser. No. 176,975, Jan. 3, 1994, abandoned.

[51] Int. Cl.$^6$ ..................................... H04M 1/27
[52] U.S. Cl. ........................... 379/355; 379/354; 379/67; 379/88
[58] Field of Search .................... 379/354, 355, 379/213, 127, 242, 245, 246, 199

[56] References Cited

U.S. PATENT DOCUMENTS

| | | | |
|---|---|---|---|
| 4,443,664 | 4/1984 | Gange | 379/142 |
| 4,873,719 | 10/1989 | Reese | 379/201 |
| 4,924,496 | 5/1990 | Figa et al. | 379/355 |
| 4,942,599 | 7/1990 | Gordon et al. | 379/207 |
| 4,945,557 | 7/1990 | Kaneuchi et al. | 379/354 |
| 4,959,855 | 9/1990 | Daudelin | 379/213 |
| 5,267,304 | 11/1993 | Slusky | 379/142 |

*Primary Examiner*—Jeffery Hofsass
*Assistant Examiner*—Jacques M. Saint-Surin
*Attorney, Agent, or Firm*—Samuel R. Williamson

[57] ABSTRACT

A caller-ID telephone station having a caller-ID based directory of telephone numbers automatically adapts its directory to compensate for a change to the area code in which the telephone station is located. The caller-ID telephone station stores the area code for all incoming caller-ID telephone numbers along with each telephone number received. The telephone station also stores its home area code. This home area code is inputted by a user during an initialization step when the telephone station is first installed, moved to a different area code or the station's locale is changed to a different area code. In response to a request from the user for dialing a telephone number entered into the directory, the telephone station compares the stored area code received as part of the caller-ID telephone number with the stored home area code and determines from this comparison whether to include or omit the received area code as part of the dialed telephone number. In one disclosed embodiment, the received area code is included in the dialed telephone number only if the received area code and the home area code are different.

11 Claims, 3 Drawing Sheets

APPARATUS AND METHOD FOR ACCESSING AND MAINTAINING A CALLER-ID BASED TELEPHONE DIRECTORY

This application is a continuation of application Ser. No. 08/176,975, field on Jan. 3, 1994, now abandoned.

BACKGROUND OF THE INVENTION

1. Technical Field

This invention relates to telephone stations and, more particularly, to telephone stations having directories for storing telephone numbers.

2. Description of the Prior Art

Telephone improvement programs in the last decade have resulted in a multitude of telephone station innovations which sere customer needs and facilitate ease of use. Illustratively, one such product is the caller-ID telephone station. When connected to a central office which provides caller-ID service, the caller-ID telephone station can read the telephone number of an incoming call and store this number in memory. With the caller-ID information, the called party may easily call back a calling party at a later time.

The incoming caller-ID information always includes the calling party's area code. If the calling party and called party are in the same area code, however, the area code information is usually not required for dialing the calling party. Thus, when the area code is not required to be dialed by the telephone station, it is deleted from memory while the telephone number is being stored in a list or directory of telephone numbers in the telephone station by the user.

In response to population growth/density pattern changes, boundaries between area codes are continually shifting. Thus a person living or working in a location covered by one area code today could find that same home or office being covered by another area code in the future. New area codes also are being created within old ones and, of course, people move from a location covered by one area code into another location covered by a different area code.

One consequence of these area code changes is that a user of a caller-ID telephone station, which maintains a directory of telephone numbers, will find, without warning, that many of the numbers for friends, relatives, and business associates stored in the directory of this telephone station to be unusable. If the user of the caller-ID telephone station moves or the station's locale is changed to a different area code, for example, those individuals who continue to be served by the original area code could not be called from the caller-ID based directory because the area code information for these numbers was previously not needed and therefore deleted when the caller-ID information was stored in the directory in the caller-ID telephone station. As a result, the caller-ID telephone station will not contain the area code for telephone numbers that it needs and also contain the area code for telephone numbers that it no longer needs. Thus, with each telephone number affected by an area code change, the user must manually reprogram the directory by either including the area code or deleting the area code for each affected telephone number in the directory as appropriate.

SUMMARY OF THE INVENTION

In accordance with the general disclosed embodiment, a telephone station having a caller-ID based directory of telephone numbers automatically adapts its directory to compensate for a change to the area code in which the telephone station is located. The telephone station stores the area code for all incoming caller-ID telephone numbers along with each telephone number received. Inputted during an initialization step, the telephone station also stores the home area code in which the telephone station is located. In response to a request by a user for dialing a telephone number stored in the directory, the telephone station compares the stored area code received as part of the caller-ID telephone number with the stored home area code and determines from this comparison whether to include or omit the received area code as part of the dialed telephone number. In accordance with one specific disclosed embodiment, responsive to a favorable comparison of the area codes, the received area code is not included in the dialed telephone number. In response to an unfavorable comparison in this same embodiment, the received area code is included in the dialed telephone number.

BRIEF DESCRIPTION OF THE DRAWING

This invention and its mode of operation will be more clearly understood from the following detailed description when read with the appended drawing in which.

Throughout the drawings, the same elements when shown in more than one figure are designated by the same reference numerals.

DETAILED DESCRIPTION

Figure 1:
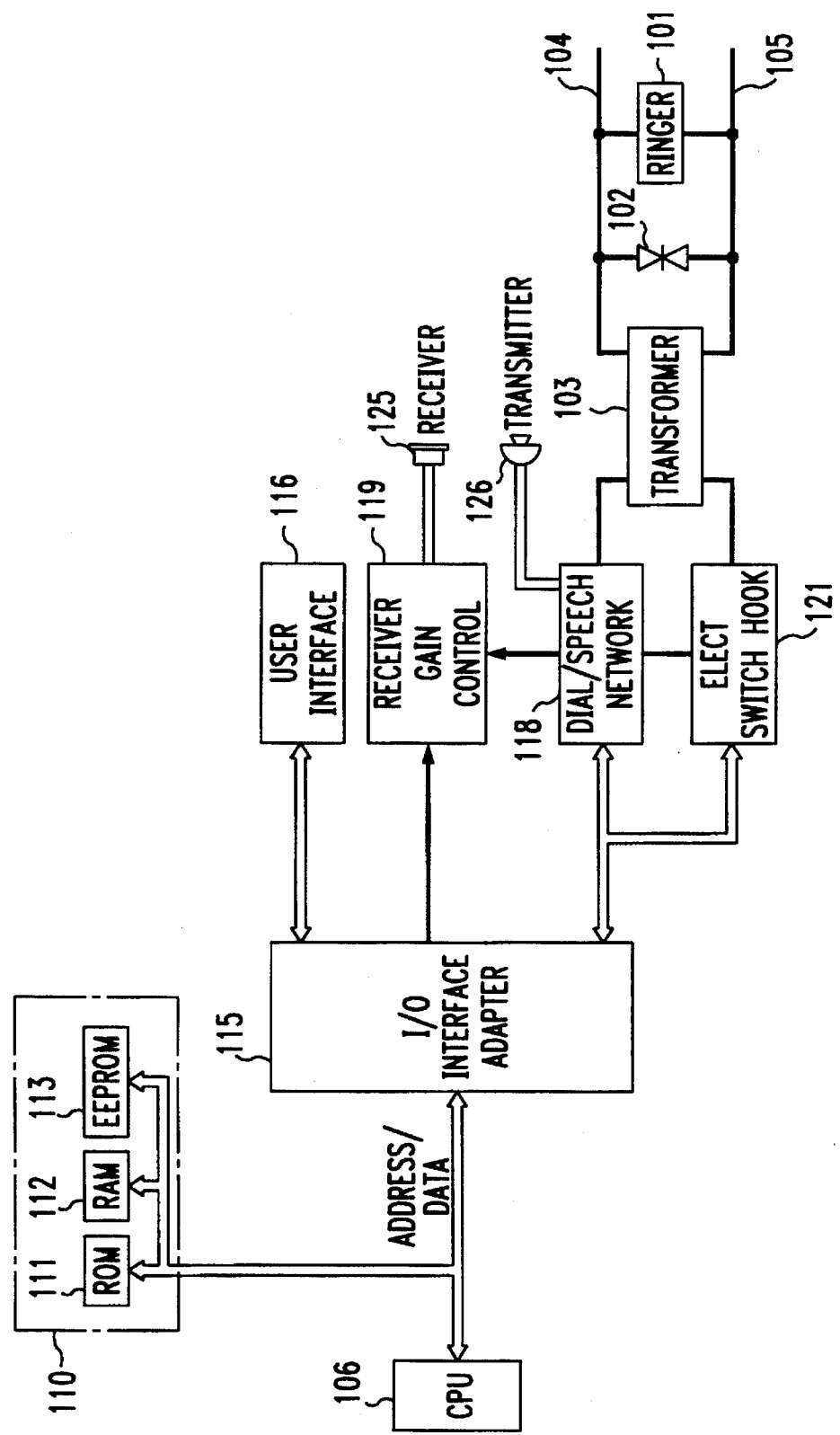
FIG. 1 shows a block diagram of the major functional components of a telephone station.

With reference to FIG. 1 of the drawing, there is shown a simplified block diagram of a telephone station for incorporating the present invention. One example of a telephone station that can perform the required functions of the invention, once the coding and circuitry disclosed herein are incorporated, is the AT&T SMART PHONE Model 2100. This phone is briefly described in an article in *Discover* Magazine entitled "Calling The Future," by David J. Fishman, page 22, February 1992.

As shown in FIG. 1, the telephone station includes a ringer 101, a varistor 102 and a transformer 103 which are included to show an illustrative connection between the telephone station and the tip and ring terminals 104, 105 of a telephone line. The telephone line connects the telephone station into the telephone communication system through a telephone central office (not shown) that has automatic number identification (ANI) capability. Such a central office has the capability of delivering the telephone number, i.e., caller-ID, associated with a calling telephone to a telephone station capable of decoding and storing such number. Such switching offices are either shown or described in U.S. Pat. No. 4,277,649 which was issued to D. Sheinbein on Jul. 7, 1981.

The numerous features and functions of the telephone station axe controlled by a central processing unit (CPU) 106. CPUs are commercially available. A CPU commercially available from Intel Corporation as Part No. 80C31 can be used for CPU 106 with the proper programming. The telephone station also includes a memory section 110 which interfaces with and stores data for proper operation of the CPU 106. This memory section comprises read only memory (ROM) 111, random access memory (RAM) 112 and electrical erasable programmable read only memory (EEPROM) 113. As an alternative to EEPROM, the memory section 110 also may have the RAM in this section backed up with a battery contained in the telephone station. In accordance with the disclosed embodiment, the memory 110 contains data representative of a directory for storing telephone numbers, this directory being described in greater detail later herein.

Connected to the CPU 106 and the memory section 110 is a peripheral input/output interface adapter 115 which includes interface circuitry and multiple ports for interfacing the CPU 106 with other circuitry in the telephone station. A user interface circuit 116 is connected into the telephone station via the adapter 115. Such an interface circuit is designed for ease of use, consistency and simplicity. This user interface circuit 115 includes, by way of illustrative example, a flat screen display element (not shown) and a touch-sensitive element (also not shown). The display element provides button images, prompts, status and other text while the touch-sensitive element provides the means for user inputs.

A simulated keyboard as well as a simulated dial keypad can be displayed on the display element in the interface circuit 116 and in response to the touching of simulated function keys or buttons, generate appropriate control signals. The flat screen display also can be used to display telephone station output information that is either the result of received information such as the telephone number of a calling party, the result of information retrievals requests, such as those directed to the caller-ID directory stored in the memory 110 or a combination of both the received and stored information. The access features of the user interface circuit are implementable in a straight forward manner in view of the known art. An interface device suitable for use as user interface 116, for example, is described in U.S. Pat. No. 4,725,694 which issued to C. M. Auer et al. on Feb. 16, 1988.

Telephone number input into the telephone station by a user is through the simulated dial keypad on the display element of the user interface 116. This dial keypad appears on the touch-sensitive element along with all other possible keys, only a portion of which are shown at any given time. Access to the user directory is available on the user interface 116 via the touching of simulated prompt keys. These keys include, for example, a "Menu" key and other suitable keys such as "Previous" and "Next" for accessing the stored incoming caller-ID based telephone numbers associated with calling parties. An arrangement for accessing a directory in a display, suitable for use in the telephone station, is described in U.S. Pat. No. 5,377,261 issued on Dec. 27, 1994.

Once the user of the telephone terminal has stored the incoming caller-ID telephone numbers, these numbers may be dialed in a repertory manner by depressing, by way of example, only one or two digits on the touch sensitive element of the interface circuit 116. An additional possible use of the user interface 116 is for selecting with one or more keys a language other than the language shown when the telephone station is in the quiescent or non-operating state.

Other circuitry in the telephone station includes a dial/speech network 118, a receiver gain control 119 and an electronic switch-hook 121. The dial/speech network 118 contains a speech hybrid for separating and combining the appropriate received and transmit audible signals and a touch-tone synthesizer for generating tones reflective of the digits entered on the user interface 116.

Certain users of the station may have need for the receiver 125 to operate at some amplification level above the nominal level. The receiver gain control 119 provides this amplification to the received signal by operating at three levels; nominal gain, 6 dB above nominal gain and 12 dB above nominal gain. The receiver gain control is connected to the dial/speech network 118 for receiving the received signal and to the adapter 115 for receiving appropriate control information. Power for operation of the telephone station is provided in a conventional manner through use of local AC line power.

While the arrangement as disclosed is directed to a telephone station, it is contemplated that the arrangement can be implemented in a similar manner to convey information in other varieties of signaling systems.

In accordance with the disclosed embodiment, the telephone station automatically adapts the caller-ID based directory of telephone numbers to compensate for a change to the area code in which the telephone station is located. In operation, the caller-ID telephone station stores the area code for all incoming caller-ID telephone numbers along with each telephone number received. The telephone station also stores the home area code, and optionally the telephone number, for the telephone station. This home area code is inputted by a user during an initialization step performed when the station is first installed, whenever the telephone station is moved to a different area code or the station's locale changed to a different area code. In response to a request from the user for dialing a telephone number stored in the directory, the telephone station compares the stored area code received as part of the caller-ID telephone number with the stored home area code and determines, based on this comparison and other coded instructions described later herein, whether to include or omit the received area code as part of the dialed telephone number.

This area code determination is made in such a manner that if the home area code changes, the telephone station automatically makes the correct decision about including the area code for a telephone number during dialing. For viewing by the user, the telephone station also correctly updates the telephone number displayed in the caller-ID based directory to either include or no longer include the area code as appropriate.

Figure 2:
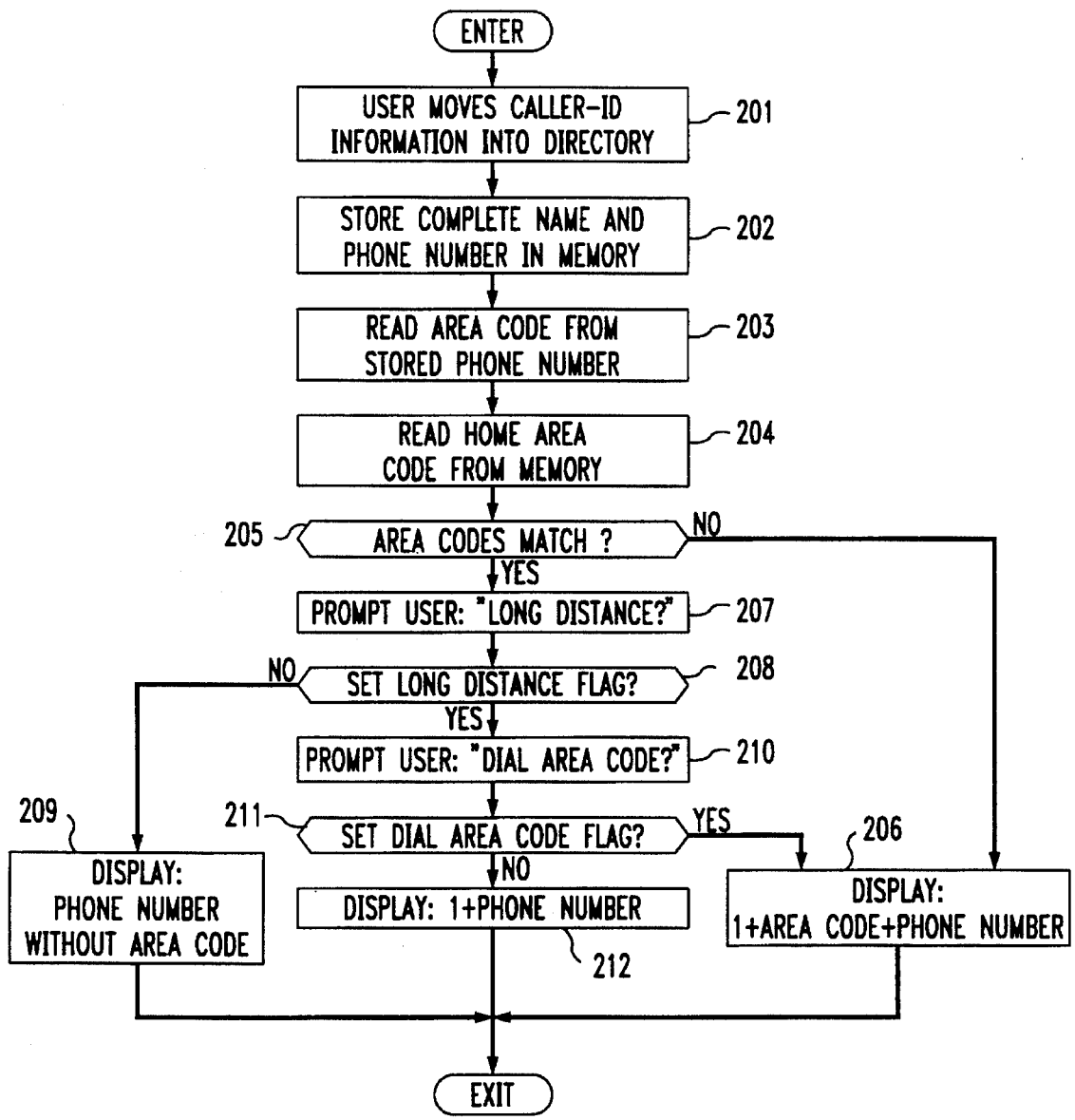
FIGS. 2 and 3 show flow charts of some of the functions performed by the circuitry in FIG. 1 in accordance with the invention.

Referring next to FIG. 2, there is shown a flow chart illustrating the operation of the telephone station in configuring the caller-ID directory of the telephone station with received caller-ID information. The functions provided by CPU 109 are advantageously determined by a process or program stored in memory 110.

The program is entered at step 201 where the user moves caller-ID information into the directory which is included in EEPROM 113. From step 201, the process advances to step 202 where the user of the telephone station, through a process such as described in U.S. patent application Ser. No. 5,377,261, stores a complete name and the received caller-ID telephone number, including the area code, into memory.

From step 202 the process advances to step 203 wherein a configuration routine for configuring this received caller-ID number for subsequent access by the user is initiated. In step 203, the area code is read from the stored telephone number. From step 203 the process advances to step 204 where the home area code, i.e., the area code in which the telephone station is located, is read from memory. As earlier indicated, the home area code is programmed into the telephone station by the user either at first use, whenever the station is moved to a different area code or the station locale is changed to a different area code. The area code of the stored telephone number and the home area code are compared in decision 205. If these area codes do not match, the process advances to step 206 where the display in the user interface displays the area code and telephone number as the user would dial it based upon selecting this configuration. From step 206 the process is exited. If the area codes do match in decision 205, however, the process advances to step 207 where the user is queried as to whether the number is a long distance call or not by a long distance query provided in the display. In response to this query, the user sets coded instructions in the process for setting a long distance flag in decision 208. These coded instructions are entered by the user simply responding to a yes or no query prompt on the display of the user interface 116. Thus, from the step 207 the process advances to the decision 208 wherein responsive to the user's input, the long distance flag is either set or not set.

If in decision 208 the user's response is that the number being set in the directory is not a long distance call, the long distance flag is not set by these coded instructions and the process advances to step 209 where the phone number without the area code is displayed for viewing by the user. From step 209, the process is exited. If in response to the long distance query provided in step 207, the user indicates that the telephone number being stored in the directory is a long distance call, the long distance flag is set in decision 208. From decision 208 and for this condition, the process advances to step 210 wherein the user is queried in order to set coded instructions as to whether the area code should be dialed with the stored telephone number. Even though the area code need not be dialed in many telephone systems within the same area code, calling certain long-distance telephone numbers in some systems require the area code to be dialed even between numbers in the same area code.

To allow for this condition, the process advances to the decision 211 where the user is given the opportunity to either set a dial area code flag or not by providing the coded instructions. If the telephone system requires that the area code be dialed, the user sets this flag and the process advances to the step 206 where the full telephone number, including the area code as it will be dialed, is shown in the display. If the telephone system does not require that the area code be dialed, but rather that the number 1 plus the telephone number be dialed, then the user does not set this flag and the process advances to step 212 where the number 1 plus the telephone number is shown in the display. From step 212 the process is exited.

Figure 3:
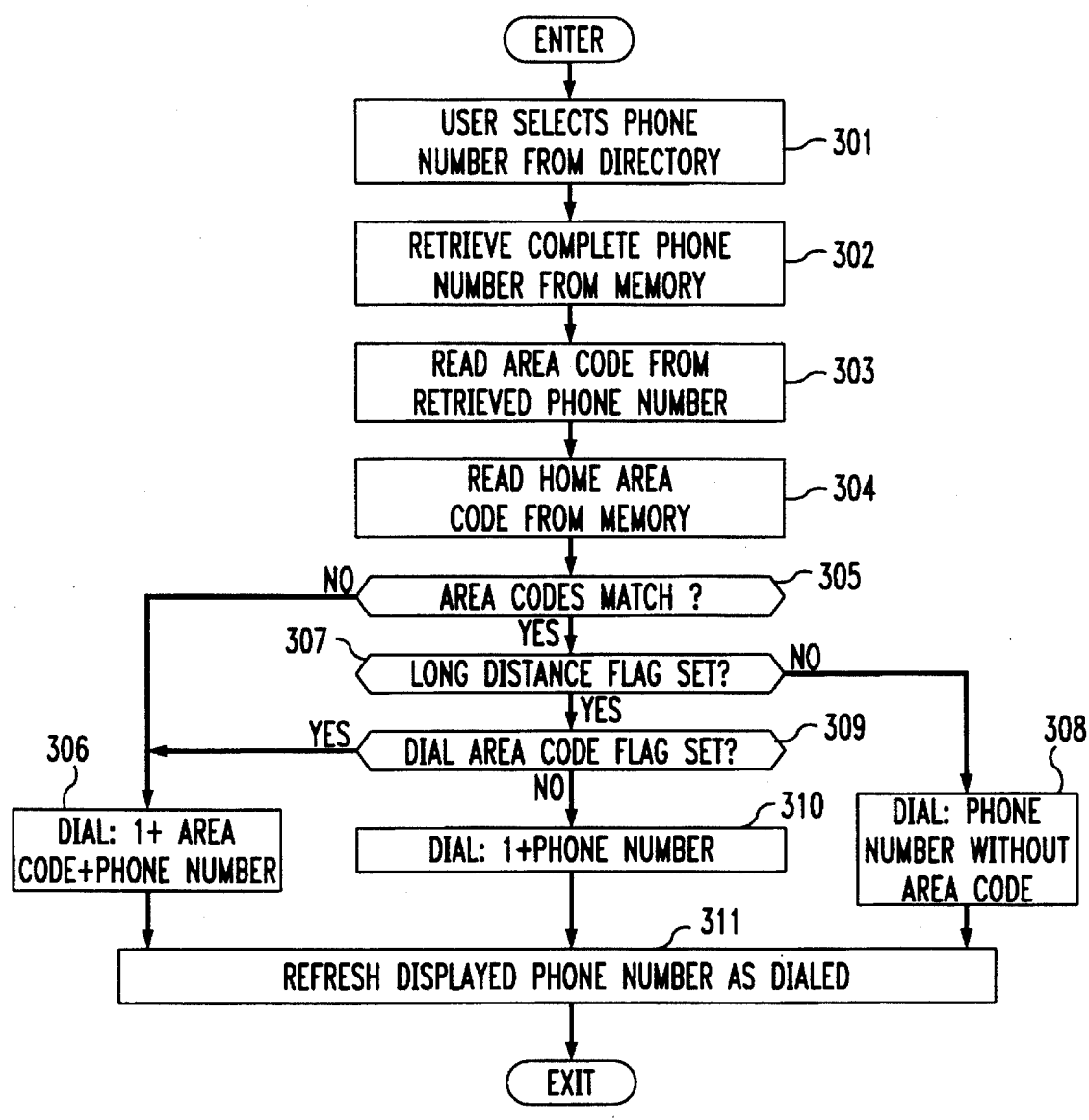

Referring next to FIG. 3 there is shown the process whereby a user accesses the telephone directory for placing a call to a telephone having its number stored in the directory. The process is entered at step 301 where the user selects the telephone number from the directory by interacting with the display on the user interface 116 in a well known manner. From step 301, the process advances to step 302 wherein the complete telephone number, including the area code, is retrieved from memory. From step 302, the process advances to step 303 where the area code is read from the retrieved telephone number. From step 303 the process moves to step 304 where the home area code of the telephone station is also read from memory. With the area code of the retrieved telephone number and the home area code available, the process advances to decision 305 where a comparison of these two codes is made.

If the area codes do not match in decision 305, the process advances to step 306 where the number 1 plus the area code and the phone number is dialed. If the area codes match in decision 305, the process advances to decision 307 where a determination is made as to whether the long distance flag is set or not. If the long distance flag is not set in decision 307, the process advances to step 308 and the telephone number is dialed without the area code. If the long distance flag is set, however, the process advances to decision 309 where a determination is made as to whether the area code flag is set. As indicated earlier herein, some telephone systems may require the dialing of the area code for some toll telephone numbers within the same area code as the home area code.

If at decision 309 the dial area code flag is set, the process advances to step 306 where the number 1 plus the area code and the telephone number, are dialed. If at decision 309 the dial area code flag is not set, the process advances to step 310 where the number 1 and the telephone number without the area code are dialed. From steps 306, 308 and 310 the process advances to step 311 where the dialed telephone number is continually displayed for viewing by the user.

Various other modifications of this invention are contemplated and may obviously be resorted to by those skilled in the art without departing from the spirit and scope of the invention as hereinafter defined by the appended claims.

I claim:

1. A telephone station comprising:

memory means for storing a telephone number and a first area code for said telephone number, and for storing a second area code indicative of a location for said telephone station, said memory means including predetermined selectable coded instructions for dialing said telephone number;

comparison means for comparing the first area code of said telephone number with the second area code; and means for selectively dialing said telephone number either with the first area code or without the first area code as a function of said comparison means, said selective dialing means also being responsive to a first set of instructions in said selectable coded instructions for including the first area code in said dialed telephone number both when said first area code compares favorably with said second area code and when said first area code compares unfavorably with said second area code.

2. The telephone station of claim 1 wherein said predetermined selectable coded instructions include a second set of instructions selectable in the absence of said first set of coded instructions, said selective dialing means being responsive to said second set of coded instructions for dialing first the number 1 and secondly the telephone number without said first area code when said first area code compares favorably with said second area code.

3. The telephone station of claim 2 wherein said telephone station is a caller-ID telephone station.

4. The telephone station of claim 3 wherein said telephone number is received from a central office as part of incoming caller-ID telephone information.

5. A method of using a directory in a telephone station for making telephone calls in a telephone system, the method comprising the steps of:

storing both a telephone number assigned to a remote telephone and a first area code for said telephone number;

storing a second area code indicative of a location for said telephone station;

storing predetermined selectable coded instructions for dialing said telephone number;

comparing the first area code of said telephone number with the second area code; and dialing said telephone number selectively as a function of said comparison step and said predetermined selectable coded instructions, responsive to a first set of instructions in said selectable coded instructions, said dialing step including the step of dialing the first area code and said dialed telephone number both when said first area code compares favorably with said second area code and when said first area code compares unfavorably with said second area code.

6. The method of claim 5 wherein said predetermined selectable coded instructions include a second set of instructions selectable in the absence of said first set of coded instructions, said selective dialing means being responsive to said second set of coded instructions for dialing firstly the number 1 and secondly the telephone number without said first area code when said first area code compares favorably with said second area code.

7. The method of claim 6 wherein said telephone station is a caller-ID telephone station.

8. The method of claim 7 wherein said telephone number is received from a central office as part of incoming caller-ID telephone information.

9. A caller-ID telephone station comprising:

means for receiving a first telephone number including a first area code as part of incoming caller-ID telephone information from a calling party;

memory means for storing said first telephone number of said calling party including the first area code for said first telephone number, and for storing a second telephone number indicative of a location for said caller-ID telephone station, said second telephone number including a second area code for said second telephone number, and said memory means including predetermined selectable coded instructions for dialing said telephone number;

comparison means for comparing the first area code of said telephone number with the second area code of the second telephone number; and means for selectively dialing said first telephone number either with the first area code or without the first area code as a function of both said comparison means and said predetermined selectable coded instructions for dialing said telephone number, responsive to said selectable coded instructions, said dialing means dialing first at least one predetermined number and secondly the telephone number without said first area code when said first area code compares favorably with said second area code, and said dialing means dialing firstly said first area code and secondly the telephone number when said first area code compares unfavorably with said second area code.

10. A telephone station comprising:

memory means for storing a telephone number and a first area code for said telephone number, and for storing a second area code indicative of a location for said telephone station, said memory means including predetermined selectable coded instructions for dialing said telephone number;

comparison means for comparing the first area code of said telephone number with the second area code; and means for selectively dialing said telephone number either with the first area code or without the first area code as a function of said comparison means and responsive to said predetermined selectable coded instructions, in the absence of said predetermined coded instructions, said selective dialing means dialing said telephone number with said first area code when said first area code compares unfavorably with said second area code and dialing said telephone number without said first area code when said first area code compares favorably with said second area code, and said selective dialing means, responsive to said selectable coded instructions, dialing firstly a predetermined number and secondly the telephone number without said first area code when said first area code compares favorably with said second area code.

11. The telephone station of claim 10 wherein said predetermined number is the number 1.

* * * * *